United States Patent [19]

Masaki et al.

[11] Patent Number: 4,769,758

[45] Date of Patent: Sep. 6, 1988

[54] ANTISKID CONTROL SYSTEM RESPONSIVE TO ROAD SURFACE REACTION

[75] Inventors: Shouichi Masaki, Anjo; Hiromi Maehata, Kariya; Ken Asami; Kazunori Sakai, both of Nagoya, all of Japan

[73] Assignees: Nippondenso Co., Ltd., Kariya; Toyota Jidosha Kabushiki Kaisha, Toyota, both of Japan

[21] Appl. No.: 850,691

[22] Filed: Apr. 11, 1986

[30] Foreign Application Priority Data

Apr. 13, 1985 [JP] Japan .................................. 60-79092

[51] Int. Cl.$^4$ .............................................. B60T 8/32
[52] U.S. Cl. ................................ 364/426.02; 303/105; 303/97
[58] Field of Search ................... 364/426, 566; 303/95, 303/97, 105; 361/238; 180/197

[56] References Cited

U.S. PATENT DOCUMENTS

| 4,196,940 | 4/1980 | Jones | 303/105 |
| 4,209,202 | 6/1980 | Jones | 303/105 |
| 4,435,768 | 3/1984 | Arikawa | 364/426 |
| 4,446,522 | 5/1984 | Sato et al. | 364/426 |
| 4,485,445 | 11/1984 | Braschel | 364/426 |

*Primary Examiner*—Gary Chin
*Attorney, Agent, or Firm*—Cushman, Darby & Cushman

[57] ABSTRACT

Disclosed is an antiskid control system for a vehicle wherein the rotational acceleration of a wheel of the vehicle is detected and the rate of variation of the detected acceleration is detected upon the onset of speed reduction of the wheel. A pressure modulator, which is located in a hydraulic line between a master cylinder and a wheel cylinder, is responsive to the detected rate of variation of acceleration to provide a pressure relief action on the fluid pressurized by the master cylinder and supplies the modulated fluid to the wheel brake cylinder.

6 Claims, 8 Drawing Sheets

ANTISKID CONTROL SYSTEM RESPONSIVE TO ROAD SURFACE REACTION

BACKGROUND OF THE INVENTION

The present invention relates generally to antiskid control system, and more specifically to an antiskid control system which detects an overshooting hydraulic brake pressure on vehicle wheels immediately following the application of brake to optimize the hydraulic brake action of the vehicle.

When the depression of a brake pedal is increased to apply a higher hydraulic pressure to spinning wheels, the latter tends to be locked and slips on the road surface. If the locking occurs in the front wheels, the traction is lost and the steering is out of control, and if it occurs in the rear wheels the lateral force is lost, causing the tail of the vehicle to oscillate sideways. Rapid acceleration will therefore bring about a very dangerous situation. Various anti-lock control systems have been in use to prevent the dangerous situation.

In an antiskid control system, an actuator, or pressure modulator modulates the hydraulic pressure in a relief, boost or hold mode in accordance with sensed operating parameters. Various methods have been proposed for the antiskid systems, which include:

(1) In one prior antiskid control system the rate of slippage is derived from wheel speed and hypothetical vehicle speed and the hydraulic pressure is controlled such that the slip rate is maintained within a prescribed range.

(2) According to a second prior art system, the acceleration and deceleration of a vehicle wheel is detected and compared with a higher threshold to determine that a wheel lock condition has occurred if the higher threshold is exceeded. Hydraulic pressure is modulated so that the wheel acceleration (or deceleration) drops below a lower threshold which indicates that wheel acceleration is restoring to the normal.

(3) A third prior art system combines the features of the first and second prior art systems as shown and described in Japanese Examined Patent Publication No. 59-20508.

However, the prior antiskid control systems involve a substantial amount of first-order time delays associated with the determination of wheel speed and acceleration, hypothetical vehicle speed and slip rate, and the time taken to operate the actuator, and the time taken for the fluid under pressure to change to calculated value. Further involved are delay factors associated with filters for eliminating undesirable ripples introduced to the system through wheel speed detectors and those associated with the inertia of the wheels. Due to the various time delay factors, the prior antiskid control system using the slip rate and wheel acceleration as control parameters tends to produce excessive pressure reduction control. Specifically, hydraulic pressure relief action tends to extend beyond the calculated period, causing an excessive bleeding of pressurized fluid. This results in a low braking efficiency and causes the bleeding fluid to produce a large kickback effect on the brake pedal as it returns to the master cylinder and eventually leads to a violent fluctuation of braking force, which can cause vibration of the steering wheel.

To overcome this problem, one prior system as shown and described in Japanese Provisional Patent Specification No. 59-130767 employs a method whereby a pressure relief action is performed for a predetermined period of time followed by a period of constant pressure. However, this system is still unsatisfactory because of the constantly changing friction coefficient of the wheels depending on varying road surfaces and because of the driver's braking action tending to vary erratically from time to time.

SUMMARY OF THE INVENTION

It is therefore an object of the invention to provide an antiskid control system which eliminates excessive amount of pressure relief action and provides a quick response to varying road surface conditions.

According to the present invention, the antiskid control system comprises a wheel acceleration detector for detecting the rotational acceleration of a vehicle wheel. An acceleration time-varying rate detector detects the onset of speed reduction of the wheel and detects the rate of variation of the acceleration upon the detection of the onset of speed reduction. A pressure modulator, which is located in a hydraulic line between a master cylinder and wheel cylinder, is responsive to the detected rate of variation to provide a pressure relief action on the fluid pressurized by the master cylinder and supplies the modulated fluid to the wheel brake cylinder.

Since the rate of variation of acceleration immediately following the onset of wheel speed reduction represents road surface reaction, the antiskid control system of the invention is free from excessive pressure relief action and provides a quick response to varying road surface conditions during braking operations.

BRIEF DESCRIPTION OF THE DRAWINGS

The present invention will be described in further detail with reference to the accompanying drawings, in which.

DETAILED DESCRIPTION

Figure 1:
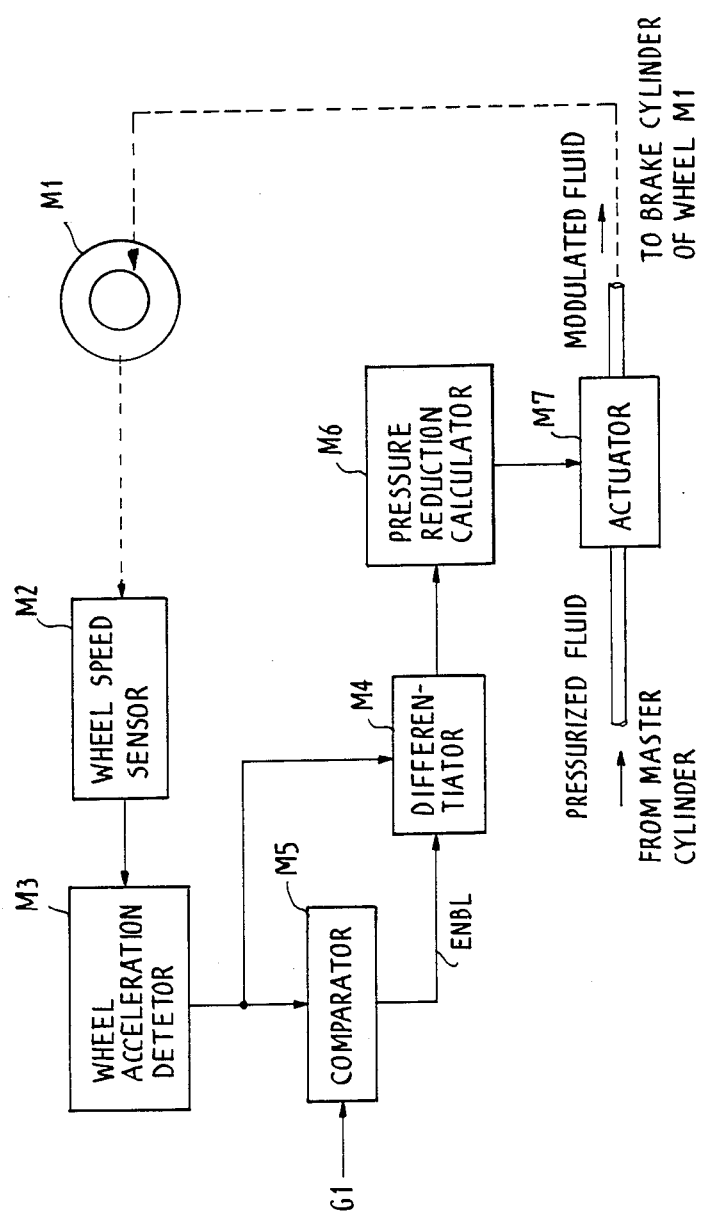
FIG. 1 is a block diagram of the basic structure of the present invention.

Referring now to FIG. 1, there is shown an antiskid control system according to an embodiment of the present invention. The system includes a wheel speed sensor M2 for detecting the rotational speed of a vehicle wheel M1 and generates therefrom a speed indicating signal. A wheel acceleration detector M3 is responsive to the speed signal to detect the rotational acceleratin of the wheel by differenting the speed signal. The output of wheel acceleration detector M3 is coupled to a differentiator M4 and to a comparator M5 which compares it with a threshold value G1 and enables the differentiator M4 to generate a signal indicative of the rate of variation of the wheel acceleration when the wheel acceleration drops below the threshold G1. The output of differentiator M4 is couled to a pressure reduction calculator M6 which derives a quantity of hydraulic pressure to be reduced in accordance with the detected rate of variation of acceleration. The output of calculator M6 is coupled to an actuator, or pressure modulator M7 located in a hydraulic line between a master cylinder and a wheel brake cylinder. Modulator M7 applies fluid pressurized by the master cylinder in response to a depression of brake pedal to the wheel brake cylinder and modulates the hydraulic pressure in accordance with the output of calculator M7 when rapid wheel speed reduction occurs.

Consider now the distribution of braking torque components about a wheel axle. Let it be assumed that the rotational speed of wheel M1 is Vw and the rotational wheel acceleration is Aw, then braking torque Tb is given by the following equation:

$$(I/R)(-Aw) + R \cdot \mu \cdot W = Tb \tag{1}$$

where,
I = inertia of wheel M1;
R = effective radius of wheel M1;
$\mu$ = friction coefficient of wheel M1 on a road surface;
W = weight of vehicle taken by wheel M1;
Therefore, $$Aw = (R/I)(R \cdot \mu \cdot W - Tb) \tag{2}$$

As a result, the variations of braking torque Tb and of a road-surface reaction force represented by the component $R \cdot \mu \cdot W$ are reflected in the acceleration value Aw. It is seen that from the acceleration value Aw the variations of braking torque and road-surface friction coefficient can be derived.

The amounts of variation of braking torque Tb and road-surface reaction are thus derived from the rate of variation of acceleration Aw during a predetermined period of time. More specifically, if the derivative of a wheel acceleration value is substantial, the rate of variations of braking torque Tb and reaction force ($R \cdot \mu \cdot W$) are also large and a large amount of pressure reduction is required to achieve effective antiskid operation.

The antiskid control system of the present invention provides pressure relief action in accordance with the rate of variation of wheel acceleration during an initial period of wheel speed reduction, specifically, during a preset time interval following the reduction of wheel acceleration below a predetermined value. Since the rate of variations of braking torque Tb and the road-surface reaction ($R \cdot \mu \cdot W$) can be represented by the rate of variation of wheel acceleration, effective antiskid control can be achieved by sensing such variations during the initial period of wheel speed reduction.

Figure 2:
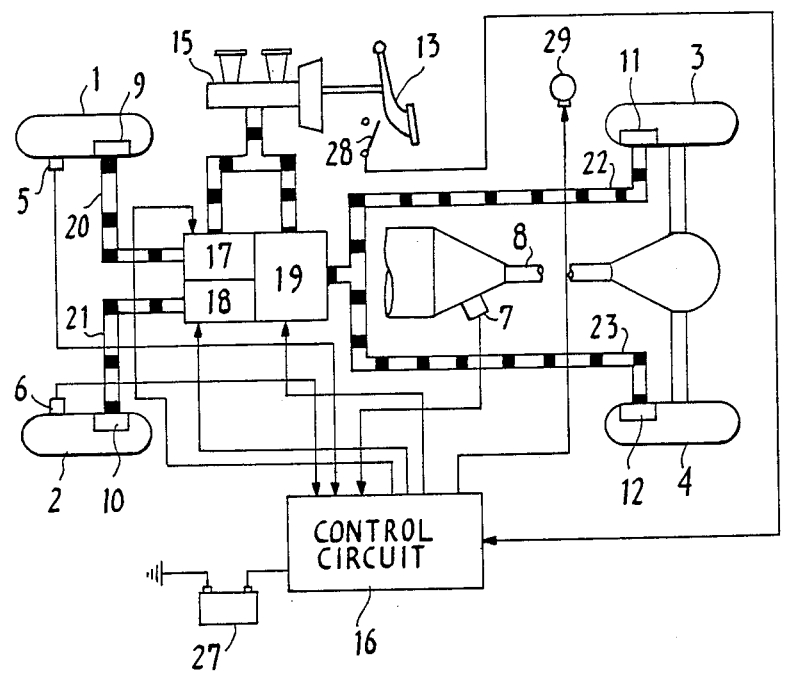
FIG. 2 is a block diagram of the antiskid control system according to an embodiment of the present invention.

In FIG. 2, a preferred embodiment of the invention is illustrated. Hydraulic pressure is produced in a master brake cylinder 15 in accordance with the amount of depression on a brake pedal 13 and routed through hydraulic actuators 17, 18 and 19 and through hydraulic lines 20 and 21 to front-right and front-left brakes 9 and 10, respectively and through rear hydraulic lines 22 and 23 to rear-right and rear-left brakes 11 and 12, respectively. Each brake includes a wheel brake cylinder to apply a braking force to the associated wheel. A control circuit 16 provides pressure trimming control on actuators 17, 18 and 19 in response to wheel-speed signals from front wheel speed sensors 5 and 6 and a rear wheel speed sensor 7 mounted on a propeller shaft 8.

Figure 3:
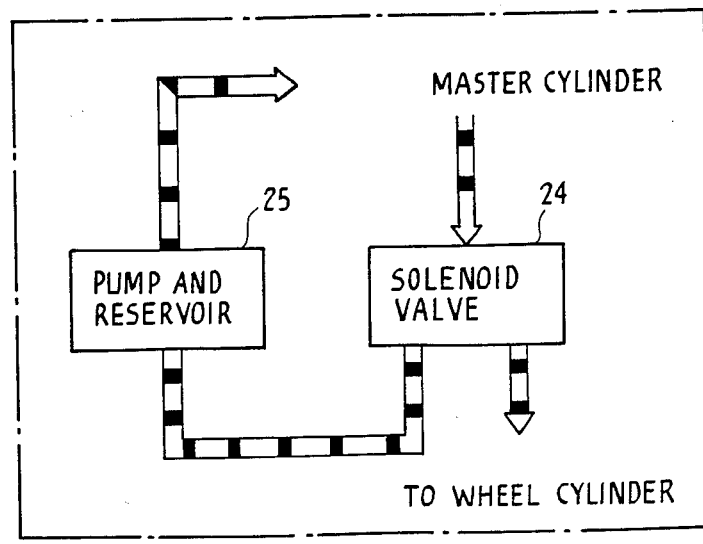
FIG. 3 is a block diagram of essential components of each of the actuators of FIG. 2.

As shown in FIG. 3, each of the actuators 17 through 19 includes a solenoid-operated pressure control valve 24 which selectively controls the hydraulic pressure in a pressure relief mode, pressure boost mode and a pressure hold mode in response to signals from control circuit 16. A pump 25 temporarily stores fluid in a reservoir when pressure relief action is performed and feeding the stored fluid back to the master cylinder 15. The fluid under controlled pressure is supplied from each actuator to the associated wheel brake cylinder. Solenoid valve 24 is of a three-position type which provides pressure relief action by establishing a fluid circuit between wheel brake cylinder and pump 25, provides pressure boost action by establishing a path between master brake cylinder and wheel brake cylinder, and provides pressure hold operation by shutting off the input and output ports of the solenoid valve 24.

Figure 4:
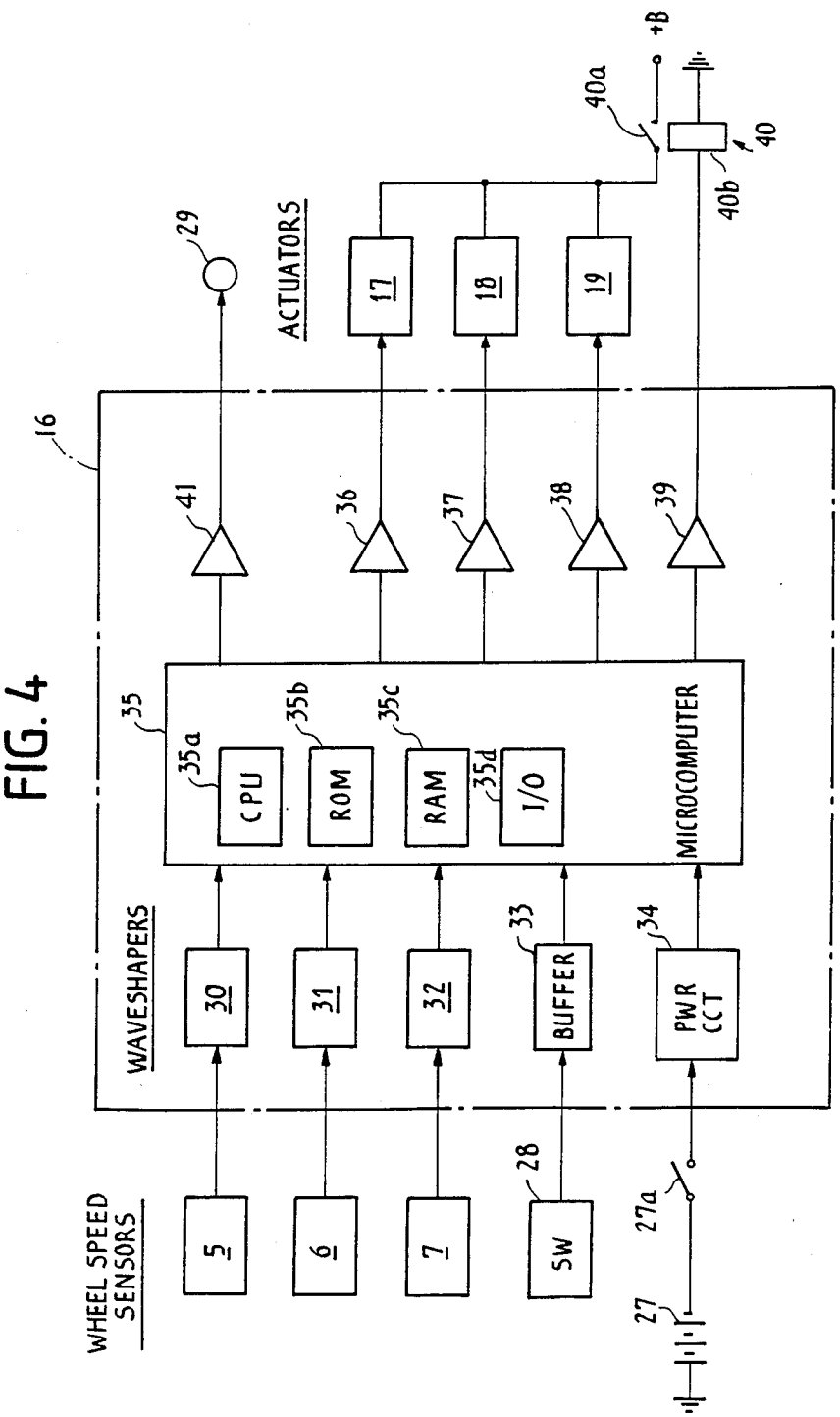
FIG. 4 is a block diagram of the electronic control circuit of FIG. 2.

As shown in FIG. 4, control circuit 16 comprises a microcomputer 35 which is powered by a power circuit 34 which stabilizes battery voltages supplied through an ignition switch 27a from battery 27. Microcomputer 35 receives wheel speed signals supplied from speed sensors 5, 6 and 7 through associated waveshapers 30, 31 and 32 and an input/output port 35d, and allows a central processing unit 35a to processes each of the wheel speed signals according to programmed instructions stored in a read-only memory 35b and delivers output signals through drivers 36, 37 and 38 to actuators 17, 18 and 19 respectively. The functions of waveshapers 30, 31 and 32 are to amplify and shape the analog speed signals into rectangular pulses. Random access memory 35c stores intermediate calculation results and data necessary for deriving extension time values as a function of a detected wheel acceleration value in a manner as will be described later. A brake switch 28 is operatively coupled to brake pedal 13 to notify the microcomputer of a manual operation of pedal 13 via a buffer amplifier 33 to initiate antiskid control. In the event that a failure occurs in the circuits to actuators or wheel speed sensors 5, 6 and 7, an indicator lamp 29 is activated through a driver 41 to alert vehicle occupants of the failure. A power-cutoff relay 40 having a winding 40b and a contact 40a is operated by an output of microcomputer 35 through a driver 39 to cut off power supply to all the actuators to inhibit antiskid operation in the event when the control circuit 16 is not functioning properly.

Figure 5:
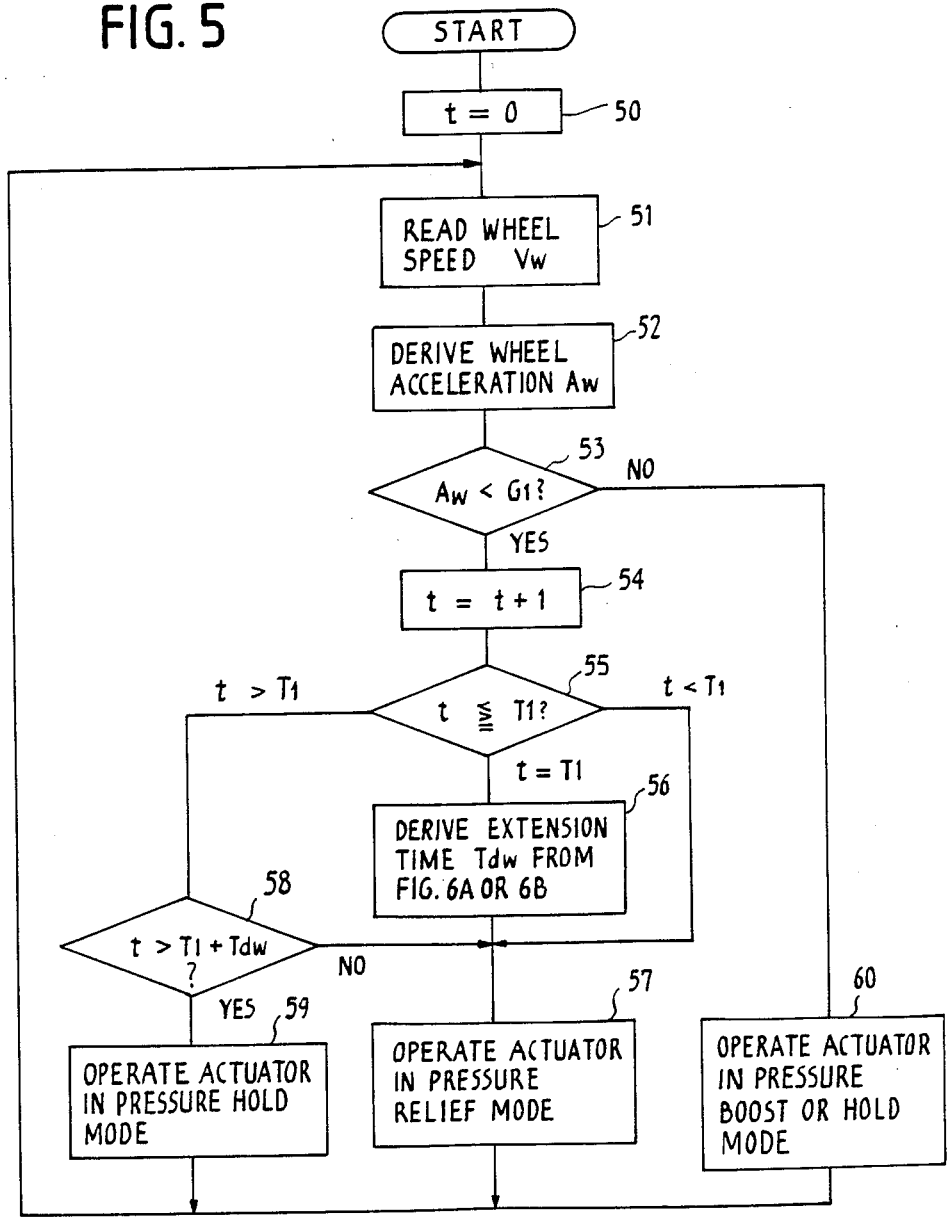
FIG. 5 is a flowchart describing an antiskid control routine of the invention performed by the microcomputer of FIG. 4.

The instructions stored in read-only memory 35b are shown in FIG. 5. For purposes of disclosure, description will only be concerned with the operation of the front-right wheel 1.

In response to receipt of a signal from brake switch 28, program execution starts with operations block 50 which directs the initialization of a timer count value "t" to zero. Exit from the initialization step is to block 51 which directs the reading of a wheel speed value Vw from speed sensor 5 by counting clock pulses present during the pulse spacing between successive wheel speed pulses appearing at the output of waveshaper 30. Control exits to operations block 52 which derives a wheel acceleration value Aw by differentiating the wheel speed value obtained in block 51. This is accomplished by detecting the difference between the wheel speed value obtained in the preceding program execution cycle and that obtained by the current cycle.

Exit from operations block 52 is to decision block 53 which compares the wheel acceleration value with threshold G1 to detect whether the wheel acceleration reduces below G1 or not. If the answer is positive, the microprocessor interprets it as the onset of speed reduction and as an indication of the tendency to skid. Control advances to operations block 54 which increments the count value "t" by one. Count value "t" is successively incremented as the program is repeated, so that it represents the time lapse from the onset of the speed reduction. Exit is to decision block 55 which compares the time lapse "t" with prescribed time T1 representing an initial period of speed reduction operation.

Figure 6A:
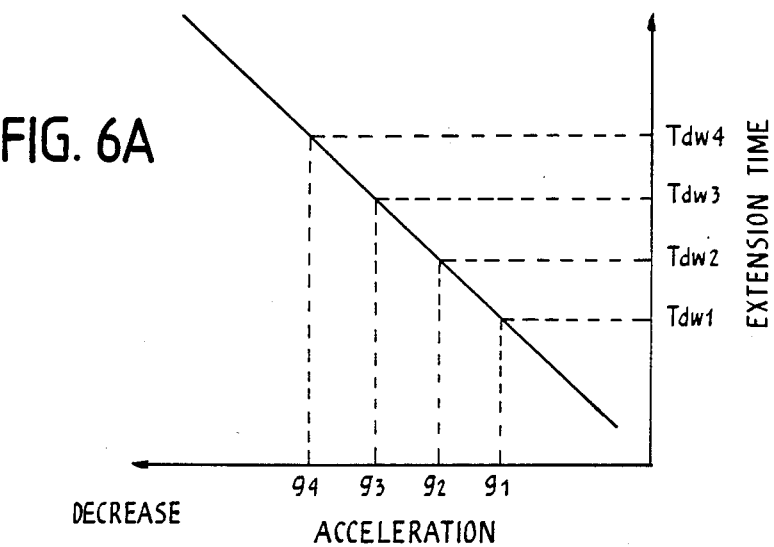
FIGS. 6A and 6B are graphic illustrations of the relationship between pressure reduction extension time intervals and wheel acceleration.
Figure 6B:
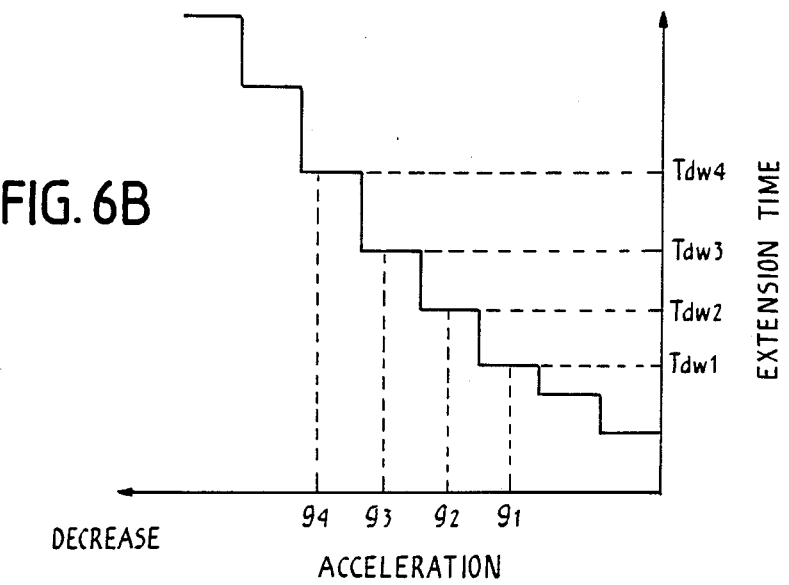

If the time lapse "t" is smaller than T1, exit from decision block 55 is to operations block 57 which directs the operation of actuator 17 in a pressure relief mode and control returns to block 51. The above process is repeated until the time lapse "t" reaches the prescribed time T1, whereupon exit from decision block 55 is to operations block 56 which directs the derivation of a pressure relief extension time Tdw from the amount of variation of wheel acceleration value. Extension time value Tdw is derived from a linear equation describing the relationships between wheel acceleration values g1, g2, g3, g4 and pressure relief extention time periods Tdw1, Tdw2, Tdw3, Tdw4, respectively as shown in FIG. 6A or derived from a map storing pressure relief time values in locations addressable as a function of wheel acceleration values g1, g2, g3 and g4 as shown in FIG. 6B. Each of the wheel acceleration values g1, g2, g3 and g4 represents a wheel acceleration with respect to zero acceleration value as shown in FIG. 7 and is translated into an extension time Tdw so that the latter is correlated to the amount of variation of wheel acceleration during the period T1.

Exit from operations block 56 is to operations block 57 to continue the pressure relief action for an interval Tdw and control returns to block 51.

In this way, the exceedance of the time lapse "t" beyond the preset value T1 causes control to exit from decision block 55 to desicion block 58 which checks to see if the time lapse "t" exceeds a combined time length (T1+Tdw). If the answer is negative, control exits to operations block 57 to continue the pressure relief operation. When the time lapse "t" exceeds the combined time length (T1+Tdw), exit from decision block 58 is to operations block 59 which directs the operation of the actuator in a pressure hold mode. Therefore, pressure relief operation is continued for an interval T1+Tdw. Due to the pressure relief and hold actions, front-right wheel regains its speed and wheel acceleration Aw now decreases gradually and exceeds the threshold value G1, whereupon the decision in block 53 changes to a negative answer and control exits to operations block 60 which directs the operation of actuator 17 in a pressure boost mode in accordance with the wheel acceleration value Aw or in a pressure hold mode, and control returns to operations block 51.

Figure 7:
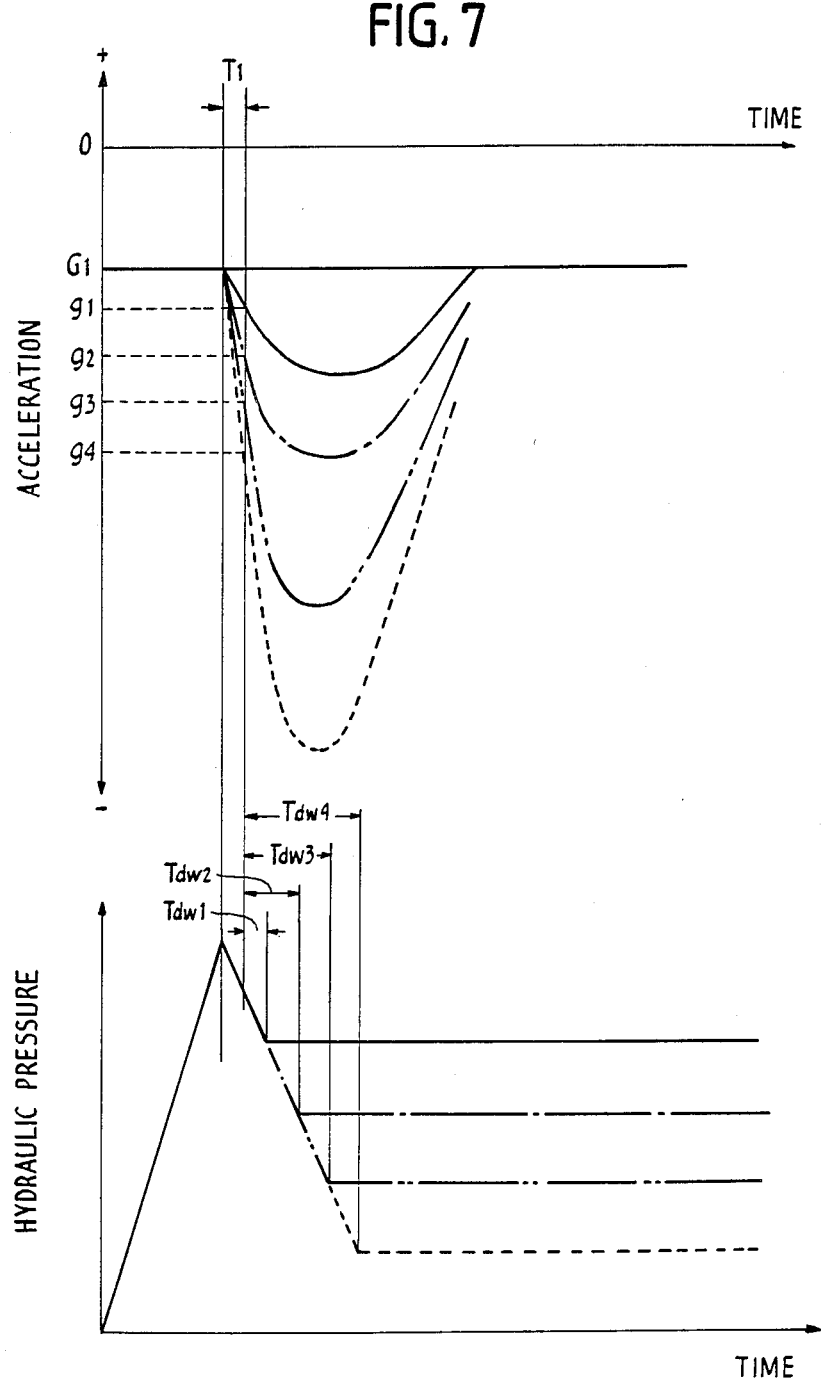
FIG. 7 is a graphic illustration of a variation of brake wheel cylinder pressure as function of the amount of wheel acceration variation within an initial time interval immediately following a reduction of wheel acceleration below a predetermined value.

Therefore, the antiskid control system as taught by the present invention the braking pressure of each hydraulic line is reduced at a constant rate for interval T1 following the reduction of wheel acceleration Aw below threshold G1 and is continuously reduced for another time interval Tdw as a function of the rate of variation of wheel acceleration value Aw during the initial period T1 of wheel deceleration as best seen in FIG. 7.

Figure 8:
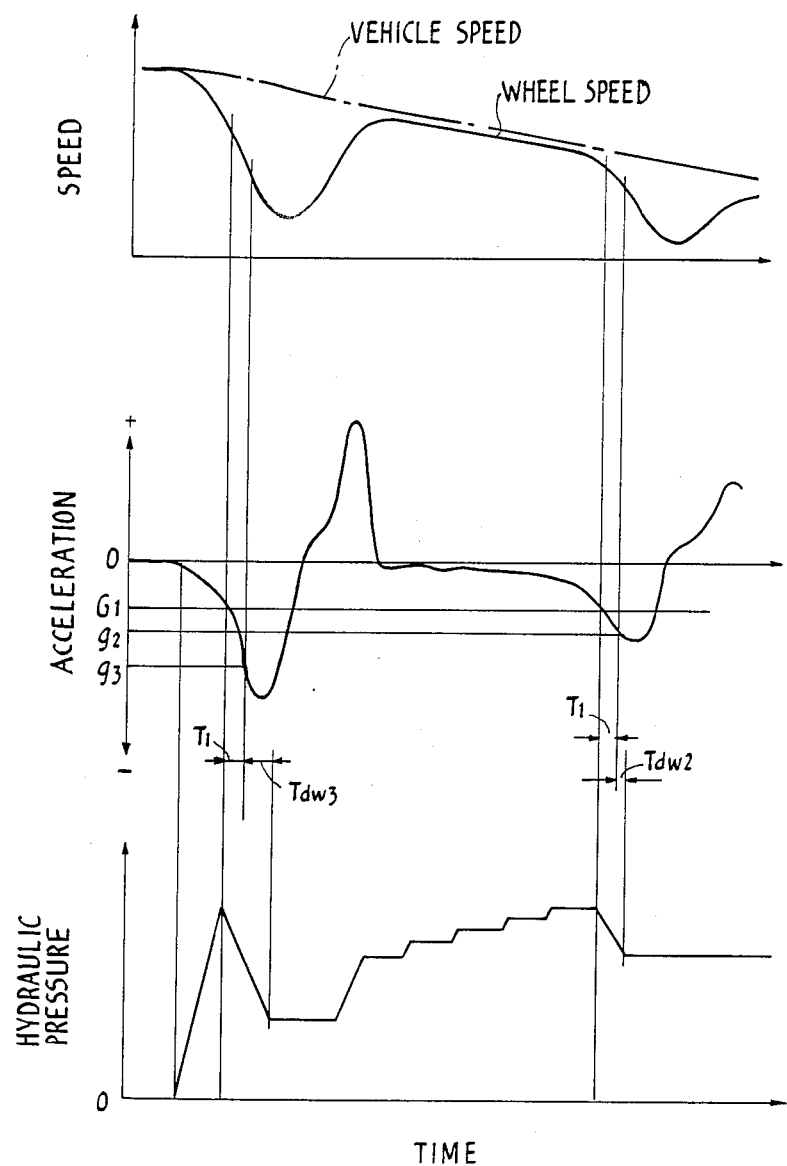
FIG. 8 is an illustration of an operating characteristic of the antiskid control system of the invention in response to successive braking actions.

FIG. 8 is a graphic illustration of the variation of wheel brake cylinder pressure following the initial period T1 in response to two successive braking actions.

Figure 9:
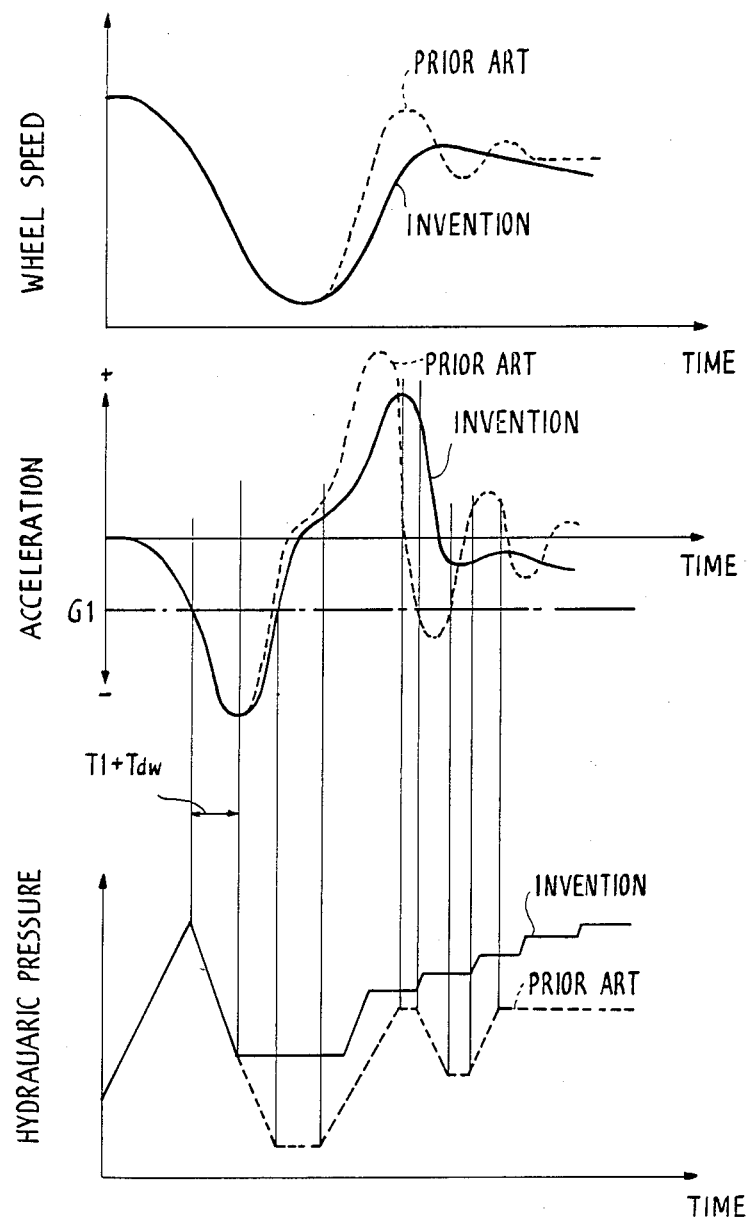
FIG. 9 is an illustration of comparison between the antiskid control system of the present invention and a prior art antiskid control system.

FIG. 9 is presented for illustration of comparison between the antiskid control system of the present invention as indicated by a solid-line curve and a prior art system as indicated by a broken-line curve. In accordance with the prior art system, the hydraulic pressure is reduced when wheel acceleration drops below a lower threshold G1 and is increased when it becomes greater than a higher threshold G2. Since the hydraulic pressure is released by an amount that is a function of a derivative of the wheel acceleration which represents road surface reaction, the invention results in an antiskid control system having no excessive pressure relief action and hence a quickly responsive characteristic to changing road surface conditions.

The foregoing description shows only preferred embodiments of the present invention. Various modifications are apparent to those skilled in the art without departing from the scope of the present invention which is only limited by the appended claims.

What is claimed is:

1. An antiskid control system for a vehicle having a hydraulic master cylinder responsive to depression of a brake pedal for applying hydraulic pressure to a hydraulic brake cylinder of a wheel of the vehicle and pressure modulating means located between said master and brake cylinders, comprising:
   acceleration detecting means for detecting the rotational acceleration of said wheel;
   means for detecting when said acceleration decreases below a predetermined value and differentiating said acceleration upon the detection of said acceleration decreasing below the predetermined value to derive a rate of variation of acceleration; and
   control means for causing said pressure modulating means to provide a pressure relief action to decrease said hydraulic pressure to said wheel by an amount based on said rate of variation of acceleration.

2. An antiskid control system as claimed in claim 1, wherein said control means causes said modulating means to operate in a pressure relief mode for an interval which is variable as a function of said rate of variation, so that the hydraulic pressure decreases at a constant rate during said interval.

3. An antiskid control system for a vehicle having a hydraulic master cylinder responsive to depression of a brake pedal for applying hydraulic pressure to a brake cylinder of a wheel of the vehicle and pressure modulating means located between said master and brake cylinders, comprising:
   acceleration detecting means for detecting the rotational acceleration of said wheel;
   means for detecting when said acceleration decreases below a predetermined value representing an onset of speed reduction of said wheel;
   means for detecting the rate of variation of said acceleration during a first interval following the detection of said acceleration decreasing below said predetermined value; and control means for causing said pressure modulating means to operate in a pressure relief mode during said first interval to decrease said hydraulic pressure at a constant rate, and subsequently causing said modulating means to operate continuously in said pressure relief mode for a second interval based on said rate of variation of acceleration.

4. An antiskid control system as claimed in claim 3, wherein said control means comprises means for producing a value indicative of said second interval based on the detected wheel acceleration according to a function describing the relationship between said detected wheel acceleration and said second interval.

5. An antiskid control system as claimed in claim 4, wherein said control means comprises means for storing a plurality of data each representing a different value of said second interval in locations addressable as a function of said detected wheel acceleration.

6. A method for controlling a hydraulic pressure modulator for modulating hydraulic pressure of fluid supplied from a hydraulic master cylinder in response to depression of a brake pedal to a wheel brake cylinder which applies a braking force on a vehicle wheel, comprising the steps of:

detecting the rotational acceleration of said wheel;

detecting when said acceleration reaches a predetermined threshold representing an onset of speed reduction of said wheel;

detecting a rate of variation of said acceleration upon the detection of said acceleration reaching said threshold; and causing said pressure modulating means to operate in a pressure relief mode to decrease said hydraulic pressure by an amount based on the detected rate of variation.

* * * * *